3,379,496
HIGH DENSITY AMMONIUM
NITRATE GRANULES
Vincent J. Russo, Cincinnati, Ohio, assignor to The Chemical and Industrial Corp., Cincinnati, Ohio, a corporation of Ohio
No Drawing. Filed Oct. 8, 1965, Ser. No. 494,261
4 Claims. (Cl. 23—103)

ABSTRACT OF THE DISCLOSURE

High density, uncoated ammonium nitrate granules and prills having improved physical properties and low hygroscopicity, primarily useful as agricultural fertilizer, containing from 0.25% to 4.0% by weight of a nucleating agent uniformly dispersed therein, and not more than 0.25% by weight of water, the nucleating agent being added to molten ammonium nitrate prior to granulation or prilling and thoroughly mixed therein, the nucleating agent having an average particle size not greater than about 40 microns and being substantially insoluble in molten ammonium nitrate so as to promote the formation of small, unstressed crystals in the melt.

This invention relates to the production of uncoated, high density granules of ammonium nitrate which maintain their original mechanical strength even after cycling through the transition temperature and which exhibit greatly improved resistance to crumbling and caking in handling and storage. Although the invention has utility in the production of ammonium nitrate granules by methods such as spherodizing, granulating, belt cooling and spray drying, it is particularly adapted to the production of substantially anhydrous prills and hence will be described as applied to the prilling process. More specifically, the present invention relates to high density ammonium nitrate prills containing from 0.25% to 4% by weight of a finely divided, substantially insoluble additive which maintains acceptable mechanical strength of the prills and greatly decreases their tendency to crumble into powder and cake as a result of ambient temperature and humidity variations.

As is well known in the art, anhydrous high density prills of ammonium nitrate are produced by concentrating an ammonium nitrate solution to approximately 99.8% by evaporation of the water therefrom. The concentrated solution is heated above the melting point and showered through a low prill tower, and cooled, to form substantially spherical prills. In present commercial practice, a "low" prill tower is about 40 feet in height as compared to the conventional "high" prill tower which is about 100 feet in height and is used for the production of low density ammonium nitrate prills. Low density prills formed in a high prill tower contain from 4% to 5% water and are passed from the tower through driers and a cooler in order to reduce the moisture content.

High density uncoated ammonium nitrate prills made by the conventional process contain surface imperfections, such as ridges and holes, due to the thermal stresses induced by rapid cooling of the molten material while dropping from the prill tower. As a result the prills have relatively low mechanical strength and are easily crushed if not carefully handled. Moreover, if stored during warm weather the prills will disintegrate into power even if not subjected to handling. This is due to the fact that ammonium nitrate transforms from an orthorhombic pseudo-tetragonal to an orthorhombic crystalline form at a transition temperature of about 90° F. (32.1° C.) with a change in volume, according to the literature, of about .02 cc. per gram. Storage under conditions where the ambient temperature may vary between about 70° F. and 100° F. therefore results in repeated thermal cycling of the material through the transition temperature from one crystalline form to the other with a consequent change in volume, thereby ultimately causing the prills to break down completely into a fine powder, even if not subjected to moving or handling. During the summer months this could occur within a few weeks of storage time. It is customary to coat prills with a clay or similar material in order to avoid this difficulty, but such coatings have not proved satisfactory.

It is a primary object of the present invention to provide high density ammonium nitrate granules which have high mechanical strength, which are not subject to disintegration upon repeated thermal cycling and which can be stored without a coating agent either in bulk form or in multi-wall paper bags.

Another object of the invention is to provide additives for high density ammonium nitrate prills which can be used in relatively small percentages to maintain acceptable mechanical strength and to improve resistance to disintegration upon prolonged storage under varying temperature conditions.

It is a further object of the invention to provide high density ammonium nitrate prills containing trace elements which are advantageous for acricultural purposes.

These and other objects of the invention which will be apparent to one skilled in the art upon reading these specifications are accomplished by those novel features and modes of operation, and parts and combinations thereof, as hereinafter described.

United States Patent No. 3,030,179, issued Apr. 17, 1962, to R. F. McFarlin et al., discloses ammonium nitrate prills containing about 2% magnesium or calcium nitrate and preferably less than 0.6% water. The magnesium or calcium nitrate, which is added to the molten ammonium nitrate before prilling, is alleged to dehydrate the ammonium nitrate crystals upon cooling, thereby increasing the mechanical strength of the prills. Earlier suggestions for improving the stability of prills have included various alkali or alkaline earth metal phosphates, sulfates, chlorides or nitrates as additives. These have produced some improvement, if used in sufficient quantity, since all such suggested additives were soluble in molten ammonium nitrate and hence tended to change the transition temperature, or eliminate the phase change. In general these involve the use of from 5% to 10% of a soluble salt, or mixtures of salts.

Contrary to the prior art approaches of adding a soluble material which dehydrates the ammonium nitrate crystals upon cooling, or which changes the transition temperature of the ammonium nitrate crystals, it has now been found that the use of not more than 4% by weight of a substantially insoluble, finely divided nucleating or seeding agent produces in high density ammonium nitrate prills a marked improvement in resistance to disintegration upon thermal cycling, while at the same time the mechanical strength is maintained well above the acceptable minimum even after thermal cycling. The amount of additive varies depending upon the particle size and density of the nucleating agent, a smaller particle size and lower density tending to decrease the amount required. The seeding agents of the present invention do not materially affect the phase change at 32.1° C.

Although not intending to be bound by theory, it is believed that addition of such finely divided materials provides nuclei in the molten ammonium nitrate around which a relatively large number of small ammonium nitrate crystals form as the prills drop from the prilling tower. Without these nuclei present the molten ammonium nitrate apparently forms a relatively small number of large crystals in each prill, or even a single crystal, while dropping from the prilling tower, the prills after solidification being mechanically weak and subject to crumbling by reason of the thermal stresses created upon cooling in these relatively large crystals.

In its broadest aspect the nucleating agents of the present invention include any material having an average particle size not greater than 40 microns, which is substantially insoluble in molten ammonium nitrate, and which is capable of promoting the formation of small unstressed crystals upon solidification.

Obviously economics will dictate the choice from a potentially wide array of materials which are operative. Aluminum silicate-containing mineral clays and magnesium or calcium silicate-containing clays have been found to be an economical and highly satisfactory nucleating or seeding agent, but numerous other insoluble materials can also be used. Excellent results have been obtained with the following additives: kaolin ground to an average particle size of about 5 microns, which is a naturally occurring clay containing predominantly aluminum silicate and having a specific gravity of 1.8; a precipitated silica having an average particle size of about .2 micron and a specific gravity of 2.0, sold by J. M. Huber Co. under the registered trademark "Zeosyl"; a processed calcium silicate-containing material having an average particle size of about .9 micron and a specific gravity of 2.9, sold by Johns-Manville Corp. under the registered trademark "Micro-Cel"; a precipitated magnesium oxide having an average particle size of about 1 micron and a specific gravity of 3.65; a commercial grade zinc oxide having an average particle size of about 5 microns, sold under the registered trademark "NuZOx." Other materials which have been used successfully include iron oxide, copper oxide, montmorillonite, tricalcium phosphate and a diatomaceous earth sold by Johns-Manville Corp. under the registered trademark "Celite," all having average particle sizes not greater than about 20 microns. Other suitable materials will suggest themselves to those skilled in the art.

The upper limit for average particle size of the nucleating agent, within the 4% maximum limitation, is in the neighborhood of 40 microns. There appears to be no sharply defined lower limit, and particle sizes approaching colloidal size (i.e. less than .1 micron) can be successfully used if available. The density or specific gravity does not constitute a limitation but merely provides a guide to determining, in conjunction with particle size, an approximation of the number of nuclei present in a given weight of a material.

It will of course be understood that mixtures of two or more of the above additives may be used in an amount totaling from 0.25% to 4.0% by weight.

For example, since the high density prills are used primarily as agricultural fertilizers, trace elements of various metals necessary for plant growth can be added, either alone or with other additives, in the form of metallic oxides having particle sizes within a range which will act as a nucleating agent with beneficial effects.

Moreover, the use of metallic oxides, either alone or with other additives, makes it possible to ammoniate the finished prills, thereby controlling the pH within precise limits as desired and also increasing slightly the amount of nitrogen in the prills. As is well known, metals such as copper and zinc form complexes with ammonia, with as many as 4 to 6 molecules of ammonia combining with each atom of the metal.

It should be recognized that although metallic oxides such as magnesium oxide, copper oxide and zinc oxide will react slowly with the molten ammonium nitrate, the particles do not dissolve completely in the melt if added immediately before the granulating step, and hence still are available to act as seeding agents. Other preferred nucleating agents, such as clays, are substantially inert to ammonium nitrate.

In addition to particle size and density another property which influences the amount of the additives which may be required to obtain the desired improvement is the surface activity of the finely divided particles of the nucleating agent. The availability of electrons, or the existence of electro-static forces, on the surfaces of the particles of the nucleating agent will promote the seeding of small ammonium nitrate crystals. Metallic oxides, such as zinc oxide and copper oxide, are thus excellent additives even though the particle size thereof may be somewhat larger than the average particle size of, e.g. a clay or a precipitated silica such as Zeosyl.

Table I summarizes test results in which commercially available uncoated ammonium nitrate prills were compared with high density ammonium nitrate prills made in a pilot plant, and with high density ammonium nitrate prills made in a pilot plant with various additives.

The mechanical strength of individual prills was tested on a "Durometer" ("A" Scale) which showed the mechanical strength of prills on a scale of from 0 to 100. In this test method a grade above 50 is commercially acceptable.

A glass bead test was devised in order to simulate in an accelerated manner the crushing of prills as a result of handling in storage and in shipment. Fifty grams of prills (either of $-10+12$, or $-12+14$ size) were placed in a 16 ounce wide-mouth sample jar with an 89 mm. cap size together with 125 grams of No. 5 borosilicate glass beads (without holes). The sample jar was placed on a ball mill roller having 2 inch rollers and was rotated for 30 minutes at 440 plus or minus 5 r.p.m. The contents of the jar were then screened through a 6 mesh screen to remove the glass beads. Next the material was screened either on a 12 mesh screen (for $-10+12$ size) or a 14 mesh screen (for $-12+14$ size) with a pan beneath for 5 minutes on the RO-TAP machine. The material passing the screen and caught in the pan was calculated as the percent crushable. Less than 10% crushable by this test method is commercially acceptable.

In order to simulate under accelerated conditions the temperature variations to which the prills may be subjected during storage and shipment, all examples in Table I were subjected to an identical thermal cycling test. Each cycle consisted in bringing the material to 70° F., holding for 2 hours, followed by heating the material to 125° F. and holding for 2 hours. This cycle was repeated 12 times for each sample tested, and the cycled material was then subjected to the Durometer crushing test and the glass bead crushing test described above.

TABLE I.—MECHANICAL STRENGTH AND THERMAL CYCLING TESTS
[Commercially available NH₄NO₃ prills vs. untreated NH₄NO₃ prills vs. NH₄NO₃ prills and additives]

| Example No. | Commercial Source or Lab. Code No. | Durometer Crusher Test, Percent | | | Glass Bead Crushing Test, Percent | |
|---|---|---|---|---|---|---|
| | | −8+10 | −10+12 | −12+14 | −10+12 | −12+14 |
| 1 | Atlas | 94.8 | 86.8 | 75.5 | 0.25 | 0.4 |
| | Atlas cycled | 35.0 | 34.0 | 65.0 | 73.5 | 42.5 |
| 2 | Solar | 94.4 | 83.8 | 72.5 | 1.8 | 1.2 |
| | Solar cycled | 60.5 | 62.0 | 59.4 | 52.5 | 32.7 |
| 3 | Spencer | 73.5 | 65.8 | 60.5 | 4.5 | 1.5 |
| | Spencer cycled | 82.5 | 75.6 | 77.5 | 2.0 | 8.8 |
| 4 | Va.-Car. | 85.6 | 74.2 | 58.9 | 5.1 | 2.9 |
| | Va.-Car. cycled | | 67.3 | 75.0 | 30.0 | 8.5 |
| 5 | Monsanto E-2 | 86.5 | 75.5 | 63.0 | Nil | Nil |
| | Monsanto E-2 cycled | | 57.5 | 58.5 | 3.5 | 4.0 |
| 6 | U.S. Powder | 18.3 | 14.5 | 11.5 | 8.0 | 2.0 |
| | U.S. Powder cycled | | | | 100.0 | 96.0 |
| 7 | Cal. Chem. | 17.5 | 24.5 | 17.0 | 43.7 | 63.2 |
| | Cal. Chem. cycled | (¹) | (¹) | (¹) | (¹) | (¹) |
| 8 | Armour | 77.5 | 61.0 | 71.0 | 6.75 | 15.0 |
| | Armour cycled | 22.5 | 23.0 | 20.8 | 92.7 | 84.8 |
| 9 | Cominco | 100.0 | | | <1 | |
| | Cominco cycled | 94.5 | | | 1.26 | |
| 10 | Lab. 54-8-2 | 80.1 | 68.2 | 72.9 | 15.2 | 17.4 |
| | Lab. 54-8-2 cycled | | 31.0 | 27.0 | 92.5 | 100.0 |
| 11 | Lab. 54-28-2 | 72.6 | 66.5 | 68.3 | 1.0 | 0.5 |
| | Lab. 54-28-2 cycled | | 14.0 | 12.0 | 96.8 | 89.3 |
| 12 | Lab. 55-12-1 | 65.5 | 51.0 | 35.0 | 3.8 | 2.0 |
| | Lab. 55-12-1 cycled | | | | 94.5 | 96.5 |
| 13 | Example 12 plus 1% KNO₃ | 68.5 | 55.5 | 38.5 | 0.8 | 0.5 |
| | Example 12 plus 1% KNO₃ cycled | | 34.5 | 27.5 | 43.3 | 40.1 |
| 14 | Example 13 plus 1% kaolin | 70.5 | 63.0 | 52.5 | 1.0 | 1.3 |
| | Example 13 plus 1% kaolin cycled | | 46.5 | 49.0 | 1.8 | 1.0 |
| 15 | Example 12 plus 1.85% Mg (NO₃)₂ | 79.5 | 78.5 | 73.5 | 1.3 | 1.5 |
| | Example 12 plus 1.85% Mg (NO₃)₂ cycled | | 65.5 | 61.0 | 0.8 | 0.8 |
| 16 | Example 12 plus 1% MgO | 96.0 | 95.0 | 90.0 | 0.13 | 0.13 |
| | Example 12 plus 1% MgO cycled | | 92.0 | 75.5 | 0.3 | 0.3 |
| 17 | Example 12 plus 1% ZnO | 97.0 | 90.0 | 78.0 | 0.3 | 0.3 |
| | Example 12 plus 1% ZnO cycled | | 86.0 | 76.0 | 0.5 | 1.0 |
| 18 | Example 12 plus 1% Zeosyl | 86.5 | 74.0 | 70.5 | 0.3 | 0.5 |
| | Example 12 plus 1% Zeosyl cycled | | 69.5 | 60.0 | 3.5 | 3.7 |
| 19 | Example 11 plus 1% KNO₃ plus 0.25% MgO | 89.5 | 81.0 | 69.5 | 1.5 | 2.5 |
| | Example 11 plus 1% KNO₃ plus 0.25% MgO cycled | | 75.0 | 59.0 | 0.3 | 2.3 |
| 20 | Example 11 plus 1% ZnO | 100.0 | 100.0 | 90.0 | 0.5 | 0.5 |
| | Example 11 plus 1% ZnO cycled | | 99.5 | 87.5 | 0.8 | 0.5 |
| 21 | Example 11 plus 0.5% CuO | 81.5 | 81.5 | 68.0 | 1.0 | 0.25 |
| | Example 11 plus 0.5% CuO cycled | | 67.5 | 64.5 | 2.0 | 3.5 |
| 22 | Example 11 plus 0.5% ZnO | 100.0 | 95.0 | 78.0 | 2.0 | 6.5 |
| | Example 11 plus 0.5% ZnO cycled | | 71.0 | 60.5 | 3.0 | 7.0 |

¹ Powdered completely.

In Table I Examples 1 through 8 were commercially available ammonium nitrate prills. Example 9 was a low density spherodized product. Examples 10 through 12 were high density ammonium nitrate prills made in a pilot plant and containing no additives of any type. Examples 13 through 22 were reprilled from the material of Examples 11 and 12 with the different additives indicated in each example in the table.

It will be noted that the mechanical strength and resistance to crumbling after thermal cycling in Examples 11 and 12 was completely unacceptable. Consequently, the marked improvement obtained by the use of nucleating agents in the materials of these examples is highly significant.

The test results of Table I indicate that excellent results in maintaining the original mechanical strength and increased resistance to crumbling as a result of handling or storage both before and after thermal cycling were obtained by the additives of the present invention, viz. Examples 14 and 16 through 22. Example 13 illustrates the negligible effect resulting from addition of a small amount of material ($KNO_3$) for the purpose of lowering the transition temperature. Example 14 shows the marked improvement obtained by adding 1% kaolin to the material of Example 13. Example 15 contains the additive of Monsanto E-2 prills (Example 5), although the results obtained with the pilot plant-produced prills of Example 15 are superior to those of the commercially available Monsanto product.

Ordinarily the acceptable pH range for ammonium nitrate prills is between 5 and 6, although a pH up to 7 or 8 may occasionally be desired for prills used for agricultural purposes. Tests were made in order to determine the possible effect of variation in pH upon mechanical strength and resistance to crumbling before and after thermal cycling of unstabilized high density ammonium nitrate prills. These results are summarized in Table II. It will be noted that an increase in pH of from 4.0 to 5.9 resulted in no significant changes in the mechanical strength or resistance to crumbling before and after thermal cycling. Although material in this pH range exhibited excellent resistance to crumbling before thermal cycling, the resistance to crumbling after thermal cycling was unsatisfactory. In view of these results investigation of the effect of pH variation in prills containing additives was not considered to be worthwhile.

TABLE II.—pH VARIATION TESTS

| Ammonium nitrate prills Commercial Source or Lab. Code No. | pH | Durometer Crusher Test, Percent | | | Glass Bead Crushing Test, Percent | |
|---|---|---|---|---|---|---|
| | | −8+10 | −10+12 | −12+14 | −10+12 | −12+14 |
| Cal. Chem. (Example 7) | 3.5 | 17.5 | 24.5 | 17.0 | 43.7 | 63.2 |
| Cal. Chem. (Example 7) cycled | --- | (¹) | (¹) | (¹) | (¹) | (¹) |
| 55-21-1 | 4.0 | 52.0 | 34.5 | 44.5 | 2.0 | 1.75 |
| 55-21-1 cycled | 4.7 | | 15.0 | 12.0 | 97.2 | 97.5 |
| 55-20-1 | 4.4 | 61.5 | 55.5 | 49.5 | 0.5 | 3.8 |
| 55-20-1 cycled | 4.6 | | 21.5 | 18.5 | 50.2 | 60.2 |
| 55-19-2 | 5.5 | 55.0 | 50.0 | 53.5 | 0.3 | 0.5 |
| 55-19-2 cycled | 4.9 | | 19.0 | | 56.2 | 89.7 |
| 55-18-2 | 5.9 | 65.0 | 24.5 | 20.5 | 1.5 | 0.3 |
| 55-18-2 cycled | 5.9 | | (¹) | (¹) | 85.8 | 100.0 |

¹ Powdered completely.

As indicated previously, it is believed that the addition of finely divided inert materials which act as nucleating or seeding agents, thereby producing formation of a relatively large number of small ammonium nitrate crystals in the prills, results in prills which are less friable, particularly after thermal cycling. The relatively small size of the ammonium nitrate crystals in the prills apparently avoids the creation of thermal stresses and surface irregularities which results from the formation of relatively large crystals. In most instances the prills decreased slightly in density after thermal cycling, thus indicating that they have increased in size and become somewhat more porous, with a consequent slight and relatively insignificant decrease in mechanical strength. Apparently minute fractures occur within the prills along the crystalline faces during the phase change, but due to the relatively large number of small crystals the fractures are discontinuous and the crystals remain interlocked, so that no marked loss in strength of the prills occurs. At the same time the minute voids and slight expansion in size of the prills apparently permit the crystals to transform from orthorhomic pseudo-tetragonal to orthorhombic, and vice versa, at the transistion temperature without disrupting the relatively weak bonding forces within the crystals. In contrast to this, in high density prills containing relatively large crystals, fractures along crystalline faces apparently result in cleavage of the prills, and there appear to be no voids in the tightly packed crystalline lattice of these prills which can accommodate the volumetric expansion of the phase change at the transition temperature. This results in disruption of the bonding forces and eventual complete disintegration of the large crystals.

As is well known, ammonium nitrate is hygroscopic, and bulk storage of uncoated ammonium nitrate prills is not possible without control of the humidity in the storage compartment, because of caking of the prills. The use of clay coatings makes possible bulk storage without humidity control, but clay coatings are unsatisfactory for a variety of reasons.

The additives of the present invention have been found to improve the bulk storage characteristics of uncoated ammonium nitrate prills under varying humidity conditions. Table III shows a comparison between a commercially available coated product; Monsanto E-2 (an uncoated product); uncoated prills containing 2% $KNO_3$; and uncoated prills containing two of the nucleating agents of the present invention. It will be noted that the prills of this invention were superior even to clay-coated prills after 72 hours at 73% relative humidity. After 72 hours at 81% relative humidity the prills containing 2% Pikes Peak Clay (a montmorillonitic clay having an average particle size not greater than about 20 microns) and NuZOx showed still greater superiority over the coated prills.

Throughout these specifications, the terms "nucleating agent" and "additive" have been used more or less interchangeably. It will of course be understood that the simplest, and probably the most economical, way to incorporate the nucleating or seeding agents of the invention is to mix them thoroughly with the molten ammonium nitrate in metered amounts just before the material is fed to the prilling tower in an otherwise conventional prilling operation wherein the molten material is passed through prilling orifices and caused to fall freely in the form of spherical droplets through a counter-current flow of cooling gas in the prilling tower, the solidified prills being collected at the bottom of the tower. However, it is within the scope of the invention to form the nucleating agent in situ during one of the stages of the ammonium nitrate production. For example, an iron salt could be added to the nitric acid, and the salt would be converted to iron oxide by reason of the oxidizing nature of the acid. The term "additive" is therefore not to be construed as a limitation on the manner in which the nucleating agent is incorporated in the ammonium nitrate before prilling.

Modifications may be made without departing from the spirit of the invention. For example, it is within the scope of the invention to add from about 0.25% to 2.0% by weight of a salt which is soluble in molten ammonium nitrate, such as potassium nitrate, ammonium phosphate, or zinc nitrate, together with the finely divided insoluble nucleating agent of the present invention. Such a soluble salt apparently tends to stabilize the prills to a very limited extent by lowering the transition temperature of ammonium nitrate a few degrees (see Example 13). Examples 14 and 19 illustrate the results obtained by incorporating 1% potassium nitrate along with 1% kaolin and 0.25% magnesium oxide, respectively.

The embodiments of the invention in which an exclusive property or privilege is claimed are defined as follows.

I claim:

1. A method of improving the physical properties of high density ammonium nitrate prills which consists of mixing with substantially anhydrous molten ammonium nitrate, before the prilling step, from 0.25% to 4.0% by weight of a nucleating agent having an average particle size not greater than about 40 microns, said nucleating agent being substantially insoluble in and inert to molten ammonium nitrate, whereby to form prills having unstressed crystals.

2. In a process of producing high density ammonium nitrate prills having good mechanical strength, low hygroscopicity and high resistance to disintegration during prolonged storage, including the steps of providing molten ammonium nitrate, reducing the moisture content thereof to less than 0.25% by weight, passing the molten, substantially anhydrous ammonium nitrate through prilling

TABLE III.—HYDROSCOPICITY TEST

| Sample | Percent Gain at 73% RH (72 hours) | | Percent Gain at 81% RH (72 hours) | |
|---|---|---|---|---|
| | Prill Size | | Prill Size | |
| | +12 | +14 | +12 | +14 |
| Cal. Chem. coated | 1.6 | 2.2 | 8.6 | 7.8 |
| Monsanto E-2 | 6.6 | 6.2 | 16.6 | 16.6 |
| $NH_4NO_3$ plus 2+ $KNO_3$ | .6 | .2 | 12.8 | 10.6 |
| $NH_4NO_3$ plus 2+ Pikes Peak Clay | .2 | .2 | 3.6 | 3.0 |
| $NH_4NO_3$ plus .5+ NuZOx | Loss | 0.8 | 2.2 | 3.4 |
| $NH_4NO_3$ plus 1+ Pikes Peak Clay plus .25% NuZOx | 0.4 | 0.4 | 3.8 | 3.6 |

The control of the moisture content during the prilling operation is important regardless of the additives which may be used, and in general the moisture content of the finished prills should not exceed 0.25% in order to assure acceptable mechanical strength and resistance to crumbling as a result of thermal cycling.

orifices, causing the molten ammonium nitrate to fall freely in the form of spherical droplets through a countercurrent flow of cooling gas whereby to solidify the droplets, and collecting and cooling the solidified prills, the improvement which comprises mixing uniformly with the molten ammonium nitrate, before passage through said prilling orifices, from 0.25% to 4.0% by weight of a nucleating agent having an average particle size not greater than about 40 microns, said nucleating agent being substantially insoluble in molten amonium nitrate, whereby to obtain prills of the uniform mixture consisting essentially of ammonium nitrate and said nucleating agent.

3. The process of claim 2, wherein said nucleating agent is chosen from the class consisting of aluminum silicate-containing clays, magnesium silicate-containing clays, calcium silicate-containing clays, and mixtures thereof.

4. High density ammonium nitrate prills having good mechanical strength, low hygroscopicity and high resistance to crumbling resulting from thermal cycling, said prills being produced by a process consisting of the steps of providing molten ammonium nitrate, reducing the moisture content thereof to less than 0.25% by weight, mixing uniformly with the molten ammonium nitrate from 0.25% to 4.0% by weight of a nucleating agent having an average particle size not greater than about 40 microns, said nucleating agent being substantially insoluble in molten ammonium nitrate, causing the uniform mixture to fall freely in the form of spherical droplets through a counter-current flow of cooling gas whereby to solidify the droplets, and collecting and cooling the solidified prills, whereby to obtain prills of the mixture consisting essentially of ammonium nitrate and said nucleating agent.

References Cited

UNITED STATES PATENTS

| | | | |
|---|---|---|---|
| 2,739,036 | 3/1956 | Kamenjar et al. | 23—103 |
| 3,049,420 | 8/1962 | Weiland | 23—103 X |
| 3,199,950 | 8/1965 | Austin | 23—103 |
| 3,223,478 | 12/1965 | Wilson | 23—103 |
| 3,282,674 | 11/1966 | Mohr et al. | 23—103 X |

FOREIGN PATENTS

| | | |
|---|---|---|
| 897,642 | 5/1962 | Great Britain. |

OSCAR R. VERTIZ, *Primary Examiner.*

A. GREIF, *Assistant Examiner.*